United States Patent [19]

Elings et al.

[11] Patent Number: 5,103,095

[45] Date of Patent: Apr. 7, 1992

[54] SCANNING PROBE MICROSCOPE EMPLOYING ADJUSTABLE TILT AND UNITARY HEAD

[75] Inventors: Virgil B. Elings, Santa Barbara; Matthew J. Longmire, Goleta, both of Calif.

[73] Assignee: Digital Instruments, Inc., Santa Barbara, Calif.

[21] Appl. No.: 527,559

[22] Filed: May 23, 1990

[51] Int. Cl.⁵ .............................................. G21K 5/10
[52] U.S. Cl. .................................. 250/306; 250/307; 250/440.11; 250/442.11
[58] Field of Search .................. 250/306, 440.1, 442.1, 250/310, 307; 310/328, 331, 311; 73/104, 105; 324/158 F, 158 P, 158 R

[56] References Cited

U.S. PATENT DOCUMENTS 4,785,177  11/1988  Besocke ............................... 250/306
4,935,634  6/1990  Hansma et al. ...................... 250/306
4,947,042  8/1990  Nishioka et al. ..................... 250/306

*Primary Examiner*—Jack I. Berman
*Assistant Examiner*—Kiet T. Nguyen
*Attorney, Agent, or Firm*—Donald A. Streck

[57] ABSTRACT

This invention is a scanning probe microscope which uses three separate motorized legs to adjust the distance between the probe and sample and to adjust the tilt between the probe and the sample. The microscope is shown configured in various ways. One form is a scanner on a base in which the base contains the sample and legs. Another is a scanner which contains the legs and rests on the sample, or may also rest on a support that spans a larger sample allowing translation of the sample independent of the scanner. Another is a scanner which contains the legs and is mounted so that a sample holder sits on the legs. The latter configuration allows for easy access to the sample. One variation of this configuration has provision for the mounting of several samples which can be sequenced for probing automatically.

19 Claims, 4 Drawing Sheets

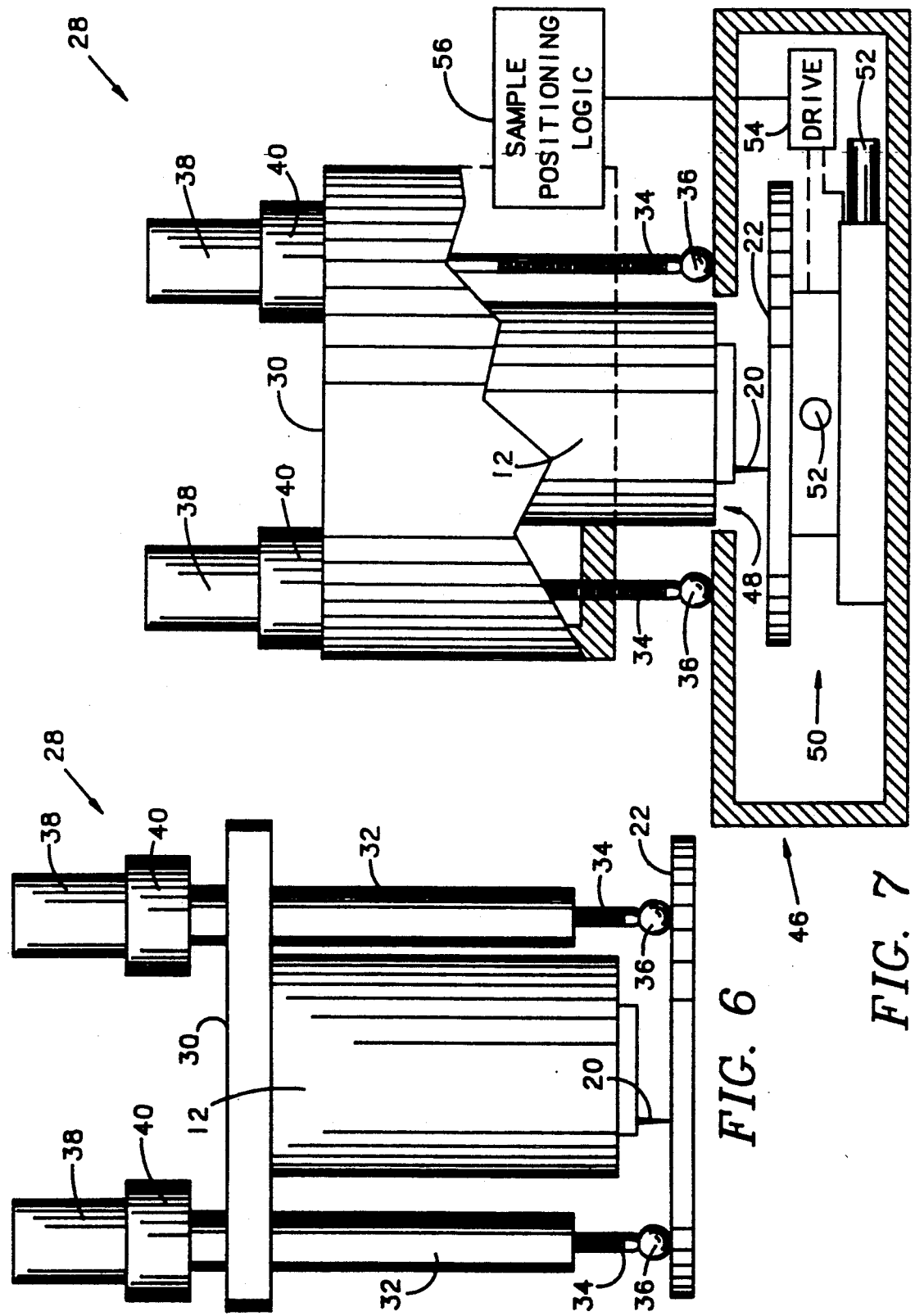

SCANNING PROBE MICROSCOPE EMPLOYING ADJUSTABLE TILT AND UNITARY HEAD

BACKGROUND OF THE INVENTION

This invention relates to scanning probe microscopes and, more particularly, in a scanning probe microscope having a probe wherein the relationship between the probe and a sample to be scanned is defined by three legs, to the improvement to allow tilt between the probe and the sample to be adjusted comprising, each of the three legs including adjusting means for adjusting a length thereof; and, tilt control means attached to the adjusting means for independently adjusting the length of selected ones of the three legs.

Scanning probe microscopes (SPMs) are instruments that provide high resolution information about the properties of surfaces. One common use of these devices is imaging, and some types of SPM have the capability of imaging individual atoms. Along with images, SPMs can be used to measure a variety of surface properties, over the range from a few angstroms to hundreds of microns. For many applications, SPMs can provide lateral and vertical resolution that is not obtainable from any other type of device.

The first type of SPM developed was the scanning tunneling microscope (STM). The STM places a sharp, conducting tip near a surface. The surface is biased at a potential relative to the tip. When the tip is brought near the surface, a current will flow in the tip due to the tunneling effect. Tunneling will occur between the atom closest to the surface in the tip and the atoms on the surface. This current is a function of the distance between the tip and the surface, and typically the tip has to be within 20 angstroms of the surface for measurable current to be present. An STM has a mechanism to scan the tip over the surface, typically in a raster pattern. While the tip is scanned over the surface, the tip is kept at a constant distance above surface features by means of a feedback loop employing the tunneling current and a vertical position controlling mechanism. The feedback loop adjusts the vertical position of the tip to keep the tunneling current, and thus the distance, constant. The vertical position of the tip is determined from the control signals applied to the vertical position controlling mechanism. The vertical position, as a function of horizontal scan position, produces a topographic map of the surface. STMs can easily image individual atoms, and can also be used for highly accurate surface measurements on larger scales, up to a few hundred microns. STMs also may be used for data other than topographic images. One alternative operation of an STM is to hold the tip stationary while varying the bias voltage applied to the sample and monitoring the tunneling current, thus measuring local current/voltage characteristics of the surface. STMs require a conducting sample surface for operation. Non-conducting surfaces may be coated with a thin conducting material such as gold or, in some cases, non-conducting materials a few atoms thick lying on a conducting surface may be imaged.

Another SPM, the atomic force microscope (AFM), similarly scans a tip across a surface. The tip in this case is mounted on the free end of a lever or cantilever which is fixed at the other end. The tip is brought to a surface such that the force interaction of the tip with the surface causes the cantilever to deflect. An AFM may be operated such that the Van der Waals attractive force between the tip and surface are near equilibrium with the repulsive force, or at larger cantilever deflections where the repulsive force, dominates. A feedback loop employing the cantilever deflection information and the tip vertical position is used to adjust the vertical position of the tip as it is scanned. The feedback loop keeps the deflection, and thus the force, constant. The tip vertical position versus horizontal scan provides the topographic surface map. In this mode, the forces on the surface can be made very small so as not to deform biological molecules. AFMs can also be operated in a mode where the repulsive force deflects the cantilever as it scans the surface. The deflection of the tip as it is scanned provides topographic information about the surface. AFMs may also be operated in a non-contact mode where the cantilever is vibrated and the Van der Waals interaction between the tip and surface affects the vibration amplitude. AFMs have a means to detect the small movements of the cantilever. Several means for cantilever motion detection have been used with the most common method employing reflected light from the cantilever. The deflection of a light beam due to the cantilever motion may be detected, or the movement of the cantilever can be used to generate interference effects which can be used to derive the motion. Like an STM, AFMs can image individual atoms; but unlike an STM, AFMs can be used for non-conducting surfaces. AFMs may also be used for measurements such as surface stiffness.

Other SPMs may use different probing mechanisms to measure properties of surfaces. Probing devices have been developed for such properties as electric field, magnetic field, photon excitation, capacitance, and ionic conductance. Whatever the probing mechanism, most SPMs have common characteristics, typically operating on an interaction between probe and surface that is confined to a very small lateral area and is extremely sensitive to vertical position. Most SPMs possess the ability to position a probe very accurately in three dimensions and use high performance feedback systems to control the motion of the probe relative to the surface.

The positioning and scanning of the probe is usually accomplished with piezoelectric devices. These devices expand or contract when a voltage is applied to them and typically have sensitivities of a few angstroms to hundreds of angstroms per volt. Scanning is implemented in a variety of ways. Some SPMs hold the probe fixed, and attach the sample to the scanning mechanism while others scan the probe. Piezoelectric tubes have been found to be the best scanning mechanism for most applications. These tubes are capable of generating three dimensional scans. They are mechanically very stiff, have good frequency response for fast scans, and are relatively inexpensive to manufacture and assemble. Such scanners are used in a commercial STM sold by the assignee of this application, Digital Instruments, Inc., under the trademark NanoScope. These scanners are made in various lengths, the larger ones having larger scan ranges.

As can be appreciated, SPMs are extremely useful research tools, allowing for information of higher resolution to be obtained more conveniently than previously possible. Some aspects of SPM performance require improvement, however, in order for SPMs to become more practical for applications requiring less operator interaction, accurate repeatable measurements for larger scale samples, and high throughput.

In the scanning probe microscope, the piezoelectric scanners typically have ranges of a few microns, so the sample must be brought close to the probe with some kind of mechanical arrangement in order for the probing of the surface to occur. Presently, these arrangements include moving the sample straight toward the probe with a screw or piezoelectric inchworm, or tilting the scanner support to bring the probe toward the surface. A prior art scanning probe microscope, which is most representative of scanning tunneling microscopes, is illustrated in FIG. 1 where it is generally indicated as 10. In this device, a scanner 12 rests on two fixed supports 14 and one movable support 16 attached to a base 18. The fixed supports 14 can be hand adjusted while the movable support 16 is motor driven and allows for automatic final approach. The scanner 12 must be hand adjusted and leveled; so, the probe 20 must be placed very near the sample 22 by eye, usually using an optical microscope, before the automatic approach is engaged. This procedure is not difficult; but, requires an operator to prepare each new probe site by hand. Other prior art SPMs utilize systems that translate the scanner toward the sample with a motion parallel to its axis. These systems may be operated with less operator participation; but, have no flexibility to adjust for sample tilt.

In many instances and for several reason, it would be useful to have the ability to control the tilt of the scanner with respect to the sample independent of positioning the probe vertically. One reason is related to the errors caused by non-linear behavior of the piezoelectric scanning elements. Piezoelectric non-linearity is a well known source of error in the art, and can affect SPM data in many ways. For large scans, one non-linear error is related to tilt between the probe and the sample. It is extremely difficult to mount a sample such that, on the scale of SPM measurements, there is not some tilt between the sample and probe. For large scans, the cumulative non-linearity errors due to the scanner make a tilted flat surface appear bowed. As one useful application of SPMs for larger scale samples is surface dimensional measurements, the distortion of a tilted sample is a serious problem. The tilt may be on only part of the sample, so having a flat sample holder will not solve this problem. What is needed is a scanner which minimizes this distortion by having the scanner able to be tilted with respect to the sample, thereby allowing compensation for an effect that otherwise decreases the utility of the instrument.

On the other hand, in the scanning of surfaces which have very steep features, such as the surface of an integrated circuit, it is useful to have a known tilt between the probe and sample. Given a tapered probe 20, such as an etched tungsten probe in the case of an STM, the probe 20 will have some angle for its profile, as indicated by the arrows in FIG. 2. If the probe 20 is perpendicular to the bottom of a groove 23 as depicted in that figure, it can be seen that it is impossible to scan all the way to the edge of the groove 23 as the side of the probe 20 will hit the side of the groove 23 before the scanning point of the tip. Thus, in order to scan to the edge of the groove 23, one must tilt the scanner (and therefore the probe 20) with respect to the sample 22 by an angle which is greater than the tip profile angle as depicted in FIG. 3. A lesser tilt would, of course, improve the situation but not completely solve it. As shown, the tilting allows the tip of the probe 20 to travel down the sidewall and determine its profile. The scanner and probe 20 would be tilted in the opposite direction in order to image the other side of the groove 23. The images of the tilted surfaces could then be patched together with the computer to construct a proper image reflecting the true surface topology of the entire groove 23. A similar procedure could be used for any very steep feature, such as a step or bump. As will be seen, this unique method is possible with the present invention as described hereinafter.

Not only would it be desirable to be able to tilt the scanner with respect to the sample in a controlled manner in order to remove tilt or create known tilts; but, it would be desirable also to be able to automatically approach the sample with the scanner in a straight line fashion over a long range so that there is no need to manually place the tip near the surface with a microscope or magnifier. Most desirable would be to have both of these abilities in a single device as it is not practical to approach a new sample or a new sample section automatically without some means to adjust the tilt. These abilities along with the ability to translate a large sample underneath the probe, or the ability to automatically sequence a series of samples to the probe would allow SPMs to be used for totally automatic inspection and characterization of either large area samples or multiple samples. Such capabilities would make SPMs much more useful for industrial applications such as imaging magnetic disks or integrated circuit wafers.

Wherefore, it is an object of this invention to provide a scanning probe microscope head which has both vertical motion and tilt motion.

It is another object of this invention to provide a scanning probe microscope head which can be used conveniently in SPMs that will have the capability for large samples, fully automated operation, and multiple samples.

Other objects and benefits of the invention will become apparent from the detailed description which follows hereinafter when taken in conjunction with the drawing figures which accompany it.

SUMMARY

The foregoing objects have been achieved in a scanning probe microscope having a probe wherein the relationship between the probe and a sample to be scanned is defined by three legs, by the improvement of the present invention to allow tilt between the probe and the sample to be adjusted comprising, each of the three legs including adjusting means for adjusting a length thereof; and, tilt control means attached to the adjusting means for independently adjusting the length of selected ones of the three legs.

In the preferred embodiment, each adjusting means comprises, an outer leg connected to the scanner; a threaded inner leg threadedly disposed within the outer leg, the inner leg having an outer end contacting a supported area adjacent a portion of the sample to be scanned; and, means for rotating the inner leg within the outer leg whereby the inner leg is threaded into and out of the outer leg to change a combined length of the inner leg and the outer leg. The preferred means for rotating the inner leg within the outer leg comprises a motor drive connected to the inner leg. The preferred motor drive comprises a DC motor with a reduction transmission connected between the DC motor and the inner leg.

In one embodiment, the three legs, the adjusting means, and the tilt control means are located in a base with the legs facing upward and the piezoelectric scanner sits on the three legs.

In another embodiment, the three legs, the adjusting means, and the tilt control means are disposed in combination with the piezoelectric scanner as part of a stand-alone head with the legs facing downward and the head sits on the three legs over (or on) a sample to be scanned. In one variation of this embodiment, there is a sample holding structure having an upper surface upon which the head sits, the upper surface having an opening therethrough through which the piezoelectric scanner can pass into an interior of the box to place the probe in contact with a surface of a sample disposed thereunder; and, sample holding and positioning means are disposed in the interior of the structure for holding a sample and for positioning selected areas of a surface of the sample under the probe of the scanner to be scanned thereby. In another variation of this embodiment there are, a sample holding member positioned over the stand-alone head and having a lower surface against which the head rests, the member having a plurality of openings therethrough through which the probe of the scanner can pass to place the probe in contact with a surface of a sample disposed within selected ones of the opening; a plurality of holding and positioning means removeably disposed in respective ones of the openings for holding individual samples and for positioning a surface of a sample held thereby over the probe of the scanner to be scanned thereby; and, indexing means for selectively positioning respective ones of the openings over the probe.

Preferably in this latter variation, the sample holding member comprises a disk mounted for rotation about a shaft in a horizontal plane; the openings comprise a plurality of shouldered bores through the disk located at spaced scanning stations of the disk; and, the plurality of sample holding and positioning means comprises a plurality of disk-shaped inserts having a bottom surface for carrying a sample to be scanned whereby the inserts may be dropped into the bores from above to rest on shoulders of the bores. This latter variation may also include means for lowering the stand-alone head while the indexing means is selectively positioning a respective one of the openings over the probe and for raising the stand-alone head after the indexing means is through selectively positioning the respective one of the openings over the probe. This could, of course, also be accomplished in an inverted configuration wherein the head is above the samples.

The probe can be fixed with the sample being mounted on a device wherein the orientation between the sample and the probe is determined by three legs on the device.

DESCRIPTION OF THE DRAWINGS

FIG. 6 is a simplified sideview drawing of a scanning probe microscope according to the present invention in its preferred embodiment as depicted in FIG. 5 wherein the head is positioned directly on a sample.

FIG. 7 is a simplified sideview drawing of a scanning probe microscope according to the present invention in its preferred embodiment as depicted in FIG. 5 wherein the head is positioned over an opening in a container having a sample or samples therein mounted on a two-dimensional sample positioning apparatus.

DESCRIPTION OF THE PREFERRED EMBODIMENT

Figure 2:
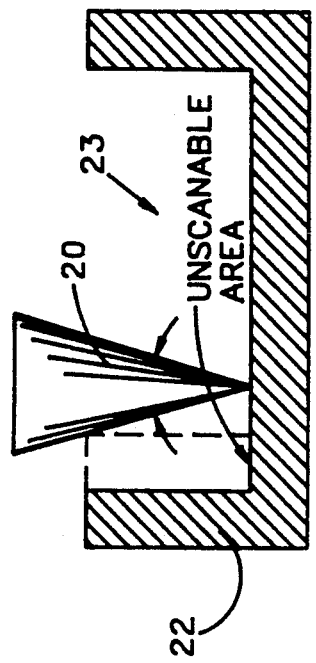
FIG. 2 is a simplified drawing depicting how a standard angled probe is unable to scan to the corner of a groove.
Figure 3:
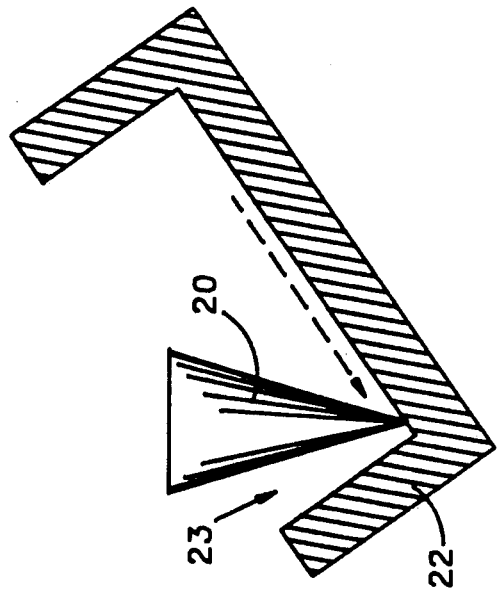
FIG. 3 is a simplified drawing depicting how the standard angled probe of FIG. 2 is able to scan to the corner of a groove when the probe is angled with respect to the groove.
Figure 1:
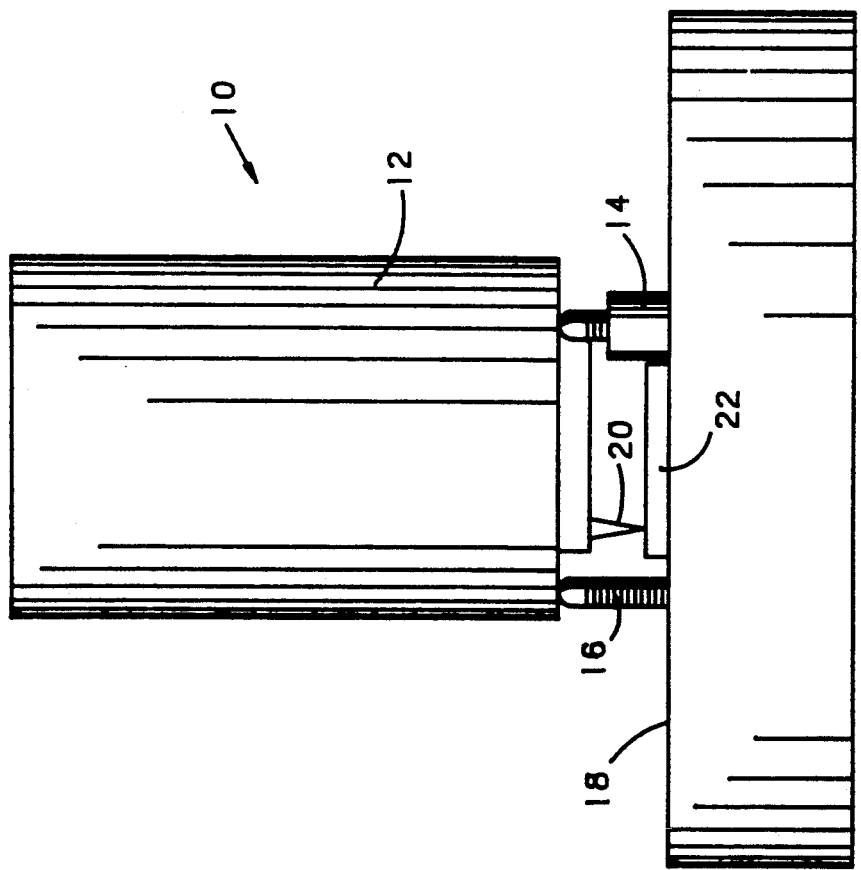
FIG. 1 is a simplified sideview drawing of a prior art scanning probe microscope as representative of scanning tunneling microscopes and depicting the typical prior art method of probe raising and lowering.
Figures 4, 5:
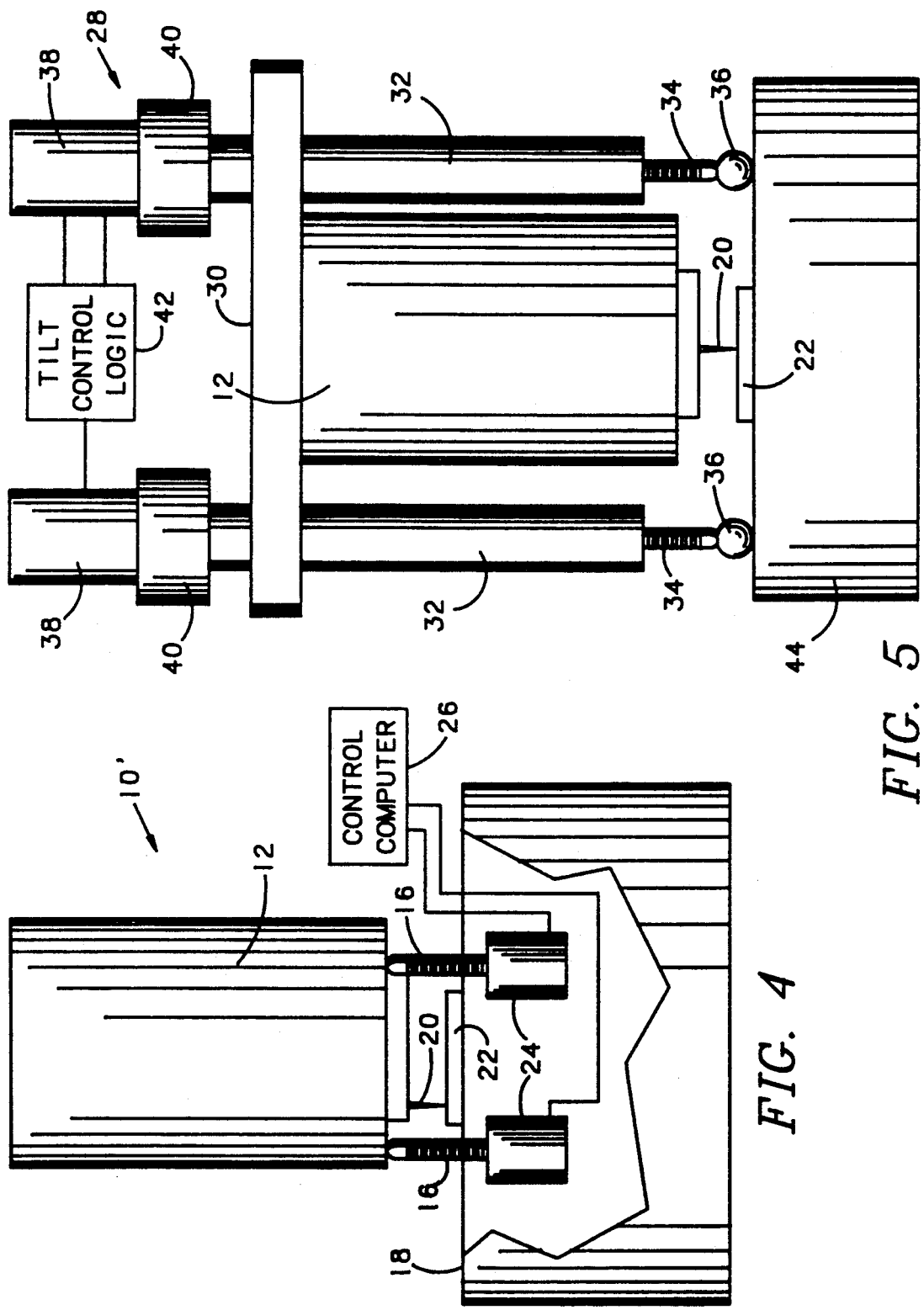
FIG. 4 is a simplified partially cutaway sideview drawing of a scanning probe microscope as in FIG. 1 modified according to the present invention in its simplest embodiment.
FIG. 5 is a simplified sideview drawing of a scanning probe microscope according to the present invention in its preferred embodiment as a free-standing head wherein the head is positioned over a sample on a sample holder.

The present invention is depicted in its most basic form in FIG. 4 where it is incorporated into a scanning probe microscope 10'. As depicted therein, according to the improvement of this invention all three of the supports are moveable supports 16 which are independently movable by motor drives 24 which are controlled by the control computer 26. In tested versions of this embodiment, the supports 16 were designed to have much longer travel, higher speed, and finer resolution than the single motorized support of the prior art microscope 10 of FIG. 1. These features allow for substantial increase in the utility of SPMs. It should also be noted initially that while the primary illustrations contained hereinafter have the sample fixed, within the scope of the invention the probe can also be fixed with the sample being mounted on a device wherein the orientation between the sample and the probe is determined by three legs on the device.

In the basic embodiment of FIG. 4, the movable supports 16 are mounted in the base 18 with the scanner 12 resting on the supports 16. A more versatile (and preferred) configuration is shown in FIG. 5. This embodiment is functionally equivalent to the embodiment of FIG. 4; but, has the advantage that the head design can be used in many SPM configurations, as will be illustrated. This embodiment is a free-standing head generally indicated as 28. The piezoelectric tube scanner 12 is mounted perpendicularly downward in the center of a support structure 30 (which may be, for example a cylindrical or triangular plate) which has three hollow legs 32 attached thereto and extending perpendicularly downward therefrom. While not completely necessary, it is preferred that the legs 32 be spaced radially at 120° intervals about the scanner 12. Threadedly disposed within each leg 32 is an inner leg 34 having a ball 36 on the bottom end thereof. The legs 32 could also be replaced by a solid structure such as a cylinder with threaded holes to receive the three inner legs 34 and a central bore for the scanner as depicted in FIG. 7. The inner legs 34 are fine threaded screws (¼-80 having been used in tested embodiments) which are rotated by individual small DC motors 38 that drive individual 1000:1 transmissions 40 which, in turn, rotate the screws 34. The motors 38 can have optical encoders on them to monitor their rotation, if desired; but, this is not considered as necessary and is, therefore, not preferred. The motors 38 are connected through an appropriate interface for the particular implementation (not shown and as will be readily determined by those skilled in the art without undue experimentation) to tilt control logic 42 which is most likely contained within the control computer 26 which controls the entire microscope. A separate tilt controller could, of course, be employed if desired and more applicable in certain applications. The head 28 in this particular illustration rests on a base 44 which holds the sample 22. The base 44 could be flat so that the head 28 could be moved around on it; or could have indexing marks (e.g., hole, groove, flat) to position the balls 36 to place the probe 20 over the sample 22 as shown in FIG. 5. The inventors herein have found that it may be useful to use magnetic balls or magnets behind ferromagnetic balls to hold the head 28 down snugly on the base 44.

The DC motors 38 are energized by the tilt control logic 42 to rotate the threaded inner legs 34 and thereby move the legs 32 up and down which, in turn, moves the support structure 30 and scanner 12 up and down. When all of the legs 32 are driven simultaneously, the support structure 30 and scanner 12 move up and down without tilting. This type of motion would be used for approaching the tip of the probe 20 to the surface of a sample 22. The motion can be quite large (several millimeters) so that the tip would not need to be placed near the sample 22 by an operator before automatic approach is started.

The tilt of the head 28 is varied by not energizing the motors 38 equally. Given the configuration depicted in FIG. 5 (i.e. one leg 32 in front of the probe 20 on the left side as the figure is viewed and two legs 32 spaced equally on either side of and behind the probe 20 on the right side as the figure is viewed), the scanner 12 can be tilted in the Y direction by raising/lowering the two right legs 32 an equal amount and/or lowering/raising the left leg 32. The scanner 12 can be tilted in X by a similar process, i.e., by raising/lowering the left leg 32 and one of the two right legs 32 an equal amount and/or lowering/raising the other right leg 32. The tilt can be monitored by the data taken from the scanning probe 20 and this data can be taken while the legs 32 are being raised and lowered so that the tilt can be set by the system even though the motorized screws do not have encoders. In this preferred approach, the feedback for the tilting comes from the scanning system itself by fitting to the plane of the vertical data instead of from positional readout devices on the motors 38. This preferred approach makes the scanning head 28 simpler and less expensive. After the tilt of the head 28 is set to a particular value, the head 28 can then be raised and lowered for changing the sample 22 by driving all three legs 32 at the same rate and in the same direction.

As thus described, the improved scan head 28 of FIG. 5 allows for long distance probe approach or removal without operator participation. At the same time, it also allows for compensation for probe/sample tilt, or for the addition of controlled tilt. These abilities allow for several new SPM configurations that will be capable of automatic operation with accuracy and high throughput for large samples, multiple samples, and special applications such as integrated circuits which have steep cliffs or trenches. These various uses for the free-standing, tiltable scan head 28 of FIG. 5 will now be described in detail.

FIG. 6 shows the scan head 28 resting directly on a large sample 22. The scan head 28 may be placed on an reasonably flat surface with the probe 20 withdrawn above the bottom of the supports. The approach and leveling operations can be accomplished automatically, making this configuration extremely convenient to use for suitable applications. This configuration would be useful for verifying surface structure or finish on large objects that would not be damaged by supporting the scan head 28.

FIG. 7 shows an extremely useful SPM configuration employing the free-standing, tiltable scan head 28. The legs 32 of the scan head 28 rest on a rigid structure 46. The structure 46 has an opening 48 in the top thereof located under the scan head 28 allowing the scan head 28 to lower the probe 22 into the structure 46. Within the structure 46 is a sample positioning system 50 that can translate a large sample 22 (or several separate samples) attached thereon in two horizontal axes on perpendicular shafts 52 by drive 54 under the control of sample positioning logic 56, allowing for rapid and automatic probing of any part of the sample 22. The positioning also could be done with a rotary stage. This would be useful for multiple samples which could be rotated into position under the scan head. Standard commercial computer-controlled positioning products, for optical and other applications, can be employed for the system 50 and have several inches of travel as well as resolution and repeatability of 1 micron or less. Given a typical large scan head 28 that can cover up to 100 microns square or more scan size, this system can probe any section of a large sample automatically. The inventors herein have tested this configuration with structures 46 made of aluminum, and also of ceramics. The structure 46 must be rigid and isolated from vibration to maintain the stability required between probe and sample. The inventors herein have demonstrated adequate stability for sample sizes of up to eight inches, which is adequate for integrated circuit wafers and most magnetic or optical storage media. The translation stage of the system 50 can be either x, y or r, $\theta$ oriented, depending on the application. The scan head 28 of this invention is critical to making a large sample system accurate and versatile as it provides the abilities to compensate for local sample tilt, or to tilt the probe 22 relative to the sample 20, allowing for accurate mapping of steep structures. In this regard, the tilt can be determined from the data gathered by fitting the vertical scan information to a plane and then calculating the tilt required to level the plane relative to the scanner axes.

Figures 8, 9:
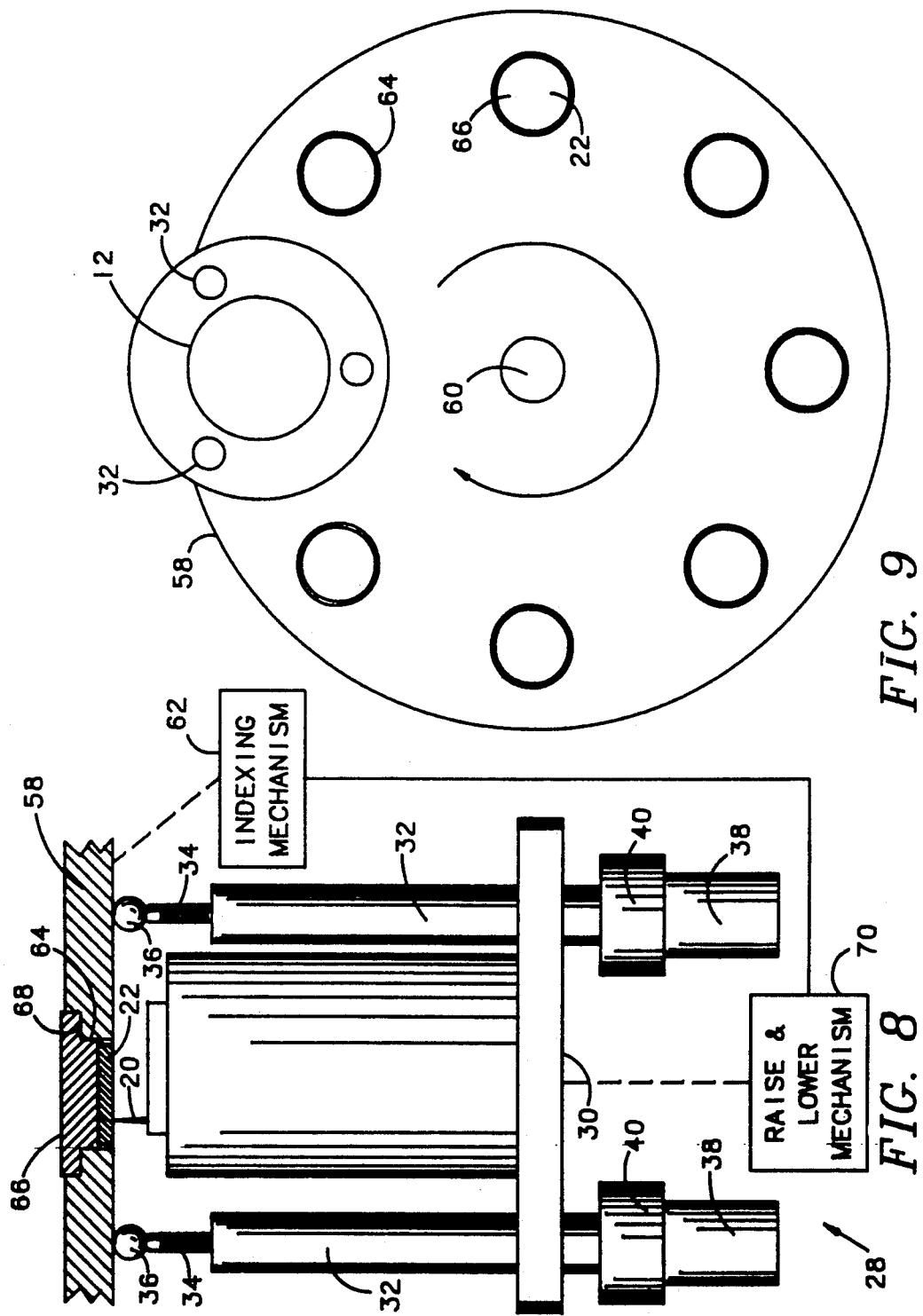
FIG. 8 is a simplified sideview drawing of a scanning probe microscope according to the present invention in its preferred embodiment as depicted in FIG. 5 wherein the head is positioned upside down under one of several samples held in a rotating, multi-positioned sample holding and positioning apparatus.
FIG. 9 is a simplified bottom view drawing of the scanning probe microscope and sample holding and positioning apparatus of FIG. 8.

Another potentially useful SPM configuration as depicted in FIGS. 8 and 9 employs the scan head 28 in an inverted orientation. A sample holding disk 58 is disposed horizontally for indexed rotation around a support shaft 60 by an indexing mechanism 62. The sample holding disk 58 has a plurality of shouldered bores 64 therein at sampling stations of the disk 58. This configuration facilitates the rapid changing of samples as an operator may attach the samples 22 to inserts 66 that may be dropped into the bores 64 from above to rest on the shoulders 68 thereof supported by gravity without conflict with the scan head 28. This system could support continuous sample cycling as the samples 22 in the sample holding disk 58 could be quickly changed without stopping the system. Preferably, the head 28 is mounted on a raise and lower mechanism 70 that works in combination with the indexing mechanism 62 under the joint control of the control computer 26. The raise and lower mechanism 70, when engaged, pushes the legs against the sample holder, thus maintaining the tilting capability. To index the sample holding disk 58 to a new sample scanning position, the head 28 is dropped slightly by the raise and lower mechanism 70 and the sample holding disk 58 is rotated to the next position with a bore 64 positioned under the probe 22. The head 28 is then raised by the raise and lower mechanism 70 until the balls 36 contact the bottom of the sample holding disk 58. The head 28 is then raised, lowered and tilted in the manner described above, as required to accomplish the scanning of the sample. As those skilled in the art will readily recognize and appreciate, this approach could also work well rotated 180° to a "right side up" configuration and, in fact, such an orientation might be preferred in some instances as there would be no necessity of the positive upward force of the scanner mechanism against the sample mount.

Wherefore, having thus described the present invention, what is claimed is:

1. In a scanning probe microscope having a scan head with a piezoelectric scanner carrying a probe and a support structure for maintaining the scanner in position relative to a surface of a sample to be scanned, the improvement comprising:
   a) the piezoelectric scanner and the support structure being part of a stand-alone head; and,
   b) a sample holding structure having an upper surface upon which said stand-alone head sits, said upper surface having an opening therethrough through which said piezoelectric scanner can pass into an interior of said structure to place the probe in contact with a surface of a sample disposed thereunder.

2. The improvement to a scanning probe microscope of claim 1 and additionally comprising:
   sample holding and positioning means disposed in said interior of said structure for holding a sample and for positioning selected areas of a surface of said sample under the probe of said scanner to be scanned thereby.

3. In a scanning probe microscope having a probe positioned over a sample to be scanned and tilt adjusting means for adjusting relative tilt between the probe and the sample, an improved method of operation comprising the steps of:
   a) determining tilt between the probe and the sample from data obtained on the sample; and,
   b) using tilt data to adjust the tilt adjusting means.

4. In a scanning probe microscope having a scan head with a piezoelectric scanner carrying a probe and a support structure for maintaining the scanner in position relative to a surface of a sample to be scanned, the improvement comprising:
   a) the piezoelectric scanner and the support structure being part of a stand-alone head;
   b) a sample holding member positioned adjacent said stand-alone head and having a facing surface aganist which said head rests, said member having a plurality of scanning stations at which the probe of said piezoelectric scanner can place the probe in contact with a surface of a sample disposed at selected ones of said scanning stations.

5. The improvement to a scanning probe microscope of claim 4 and additionally comprising:
   indexing means for selectively positioning respective ones of said scanning stations opposite the probe.

6. The improvement to a scanning probe microscope of claim 4 wherein:
   said scanning stations comprise a plurality of openings through which the probe of said piezoelectric scanner can pass to place the probe in contact with a surface of a sample disposed within selected ones of said openings.

7. The improvement to a scanning probe microscope of claim 6 and additionally comprising:
   a plurality of sample holding and positioning means removeably disposed in respective ones of said openings for holding individual samples and for positioning a surface of a sample held thereby opposite the probe of said scanner to be scanned thereby.

8. The improvement to a scanning probe microscope of claim 6 wherein:
   a) said sample holding member comprises a disk mounted for rotation about a shaft in a horizontal plane; and,
   b) said openings comprise a plurality of shouldered bores through said disk located at spaced ones of said scanning stations.

9. The improvement to a scanning probe microscope of claim 8 and additionally comprising:
   a plurality of sample holding and positioning means comprising a plurality of disk-shaped inserts having a surface for carrying a sample to be scanned whereby said inserts may be dropped into said bores from above to rest on shoulders of said bores.

10. The improvement to a scanning probe microscope of claim 6 and additionally comprising:
    means for withdrawing said stand-alone head while said indexing means is selectively positioning a respective one of said openings opposite the probe and for repositioning said stand-alone head after said indexing means is through selectively positioning said respective one of said openings opposite the probe.

11. In a scanning probe microscope having a scan head with a piezoelectric scanner carrying a probe and a support structure for maintaining the scanner in position relative to a surface of a sample to be scanned, the improvement comprising:
    a) the piezoelectric scanner and the support structure being part of a stand-alone head;
    b) a sample holding disk mounted for rotation about a shaft in a horizontal plane positioned adjacent said stand-alone head and having a facing surface against which said head rests, said member having a plurality of bores therethrough located at spaced scanning stations of said disk through which the probe of said piezoelectric scanner can pass to place the probe in contact with a surface of a sample disposed within selected ones of said openings.

12. The improvement to a scanning probe microscope of claim 11 and:
    a) a plurality of disk-shaped inserts removeably disposed in respective ones of said openings for holding individual samples and for positioning a surface of a sample held thereby opposite the probe of the scanner to be scanned thereby, said disk-shaped inserts each having a surface for carrying a sample to be scanned; and, b) indexing means for rotating said disk to selectively positioning respective ones of said scanning stations opposite the probe.

13. The improvement to a scanning probe microscope of claim 12 and additionally comprising:

means working in combination with said indexing means for withdrawing said stand-alone head while said indexing means is selectively positioning a respective one of said scanning stations opposite the probe and for repositioning said stand-alone head after said indexing means is through selectively positioning said respective one of said scanning stations opposite the probe.

14. In a scanning probe microscope having a probe positioned over a sample to be scanned and tilt adjusting means for adjusting relative tilt between the probe and the sample, an improved method of operation wherein the surface being scanned includes a groove having a pair of side edges comprising the steps of:

a) first tilting the probe with respect to the sample in a first direction to scan into one edge of the groove; and, b) next tilting the probe with respect to the sample in a second direction opposite the first direction to scan into the other edge of the groove.

15. The method of claim 14 and additionally comprising the step of:

c) calculating scan data reflecting the true surface topology of the entire groove from data gathered during steps (a) and (b).

16. In a scanning probe microscope having a probe positioned over a sample to be scanned and tilt adjusting means for adjusting relative tilt between the probe and the sample, an improved method of operation wherein the surface being scanned includes a step edge comprising the step of:

tilting the probe with respect to the sample greater than a half angle of the probe's tip to scan the edge.

17. In a scanning probe microscope having a scan head with a piezoelectric scanner carrying a probe and a support structure for maintaining the scanner in position relative to a surface of a sample to be scanned an improved method of construction and operation comprising the steps of:

a) providing a sample holding structure having an upper surface upon which the head can sit;

b) providing an opening through the upper surface through which the piezoelectric scanner can pass into an interior of the structure to place the probe in contact with a surface of a sample disposed thereunder;

c) providing a sample holding and positioning apparatus in the interior of the structure capable of holding a sample and positioning selected areas of a surface of the sample under the probe of the scanner to be scanned thereby;

d) positioning the head on the upper surface;

e) attaching a sample to the sample holding and positioning apparatus;

f) using the sample holding and positioning apparatus to position a selected area of the surface of the sample under the probe of the scanner; and, g) using the scanner to scan the selected area.

18. The method of claim 17 and additionally comprising the steps of:

a) constructing the support structure in combination with the piezoelectric scanner as part of a stand-alone head;

b) positioning a sample holding member adjacent the stand-alone head with a facing surface of the sample holding member resting against the head;

c) providing a plurality of openings through the sample holding member through which the probe of the piezoelectric scanner can pass to place the probe in contact with a surface of a sample disposed within selected ones of the openings;

d) mounting samples to be scanned to respective ones of a plurality of sample holding and positioning members;

e) disposing the plurality of sample holding and positioning members in respective ones of the openings; and, f) selectively and sequentially positioning respective ones of the openings opposite the probe with a surface of the sample held thereby opposite the probe of the scanner to be scanned thereby and scanning the sample associated therewith.

19. The method of claim 18 and additionally comprising the steps of:

a) withdrawing the stand-alone head while selectively positioning a respective one of the openings opposite the probe; and, b) repositioning the stand-alone head after selectively positioning the respective one of the openings opposite the probe.

* * * * *